United States Patent

[11] 3,629,068

| [72] | Inventors | Edward Lantz<br>Strongsville;<br>Harry W. Davison, Cleveland, both of Ohio |
|---|---|---|
| [21] | Appl. No. | 751,215 |
| [22] | Filed | Aug. 8, 1968 |
| [45] | Patented | Dec. 21, 1971 |
| [73] | Assignee | The United States of America as represented by the Administrator of the National Aeronautics and Space Administration |

[54] GASEOUS CONTROL SYSTEM FOR NUCLEAR REACTORS
5 Claims, 2 Drawing Figs.

[52] U.S. Cl. .................................................. 176/86 G
[51] Int. Cl. .................................................. G21c 7/22
[50] Field of Search ........................................ 176/86 G, 22

[56] References Cited
UNITED STATES PATENTS

| 3,025,228 | 3/1962 | Whitelaw | 176/86 G X |
| 3,227,619 | 1/1966 | Plante | 176/86 G X |
| 3,251,746 | 5/1966 | Jeffries et al. | 176/86 G X |
| 3,498,879 | 3/1970 | Dastur | 176/86 G X |

FOREIGN PATENTS

| 786,439 | 5/1968 | Canada | 176/86 G |
| 1,158,320 | 6/1958 | France | 176/86 G |
| 1,080,384 | 8/1967 | Great Britain | 176/86 G |

*Primary Examiner*—Carl D. Quarforth
*Assistant Examiner*—Harvey E. Behrend
*Attorneys*—N. T. Musial, G. E. Shook and G. T. McCoy

ABSTRACT: Controlling the reactivity of a nuclear reactor by varying the amount of a neutron-absorbing gas located inside the reactor.

INVENTORS
EDWARD LANTZ
HARRY W. DAVISON

BY

ATTORNEYS

3,629,068

GASEOUS CONTROL SYSTEM FOR NUCLEAR REACTORS

STATEMENT OF GOVERNMENT OWNERSHIP

The invention described herein was made by employees of the United States Government and may be manufactured and used by or for the Government for governmental purposes without the payment of any royalties thereon or therefor.

BACKGROUND OF THE INVENTION

This invention relates to an absorbing-gas reactivity control system for a nuclear reactor. The invention is particularly directed to a control system which alters the reactivity with a minimum change in the spatial distribution of the neutron flux.

Nuclear reactors normally have control rods in the form of solid neutron absorbers which are reoriented in the neutron field to control the reactivity. This may result in a change in the spatial distribution of the neutron field thereby producing undesirable temperature distributions in the reactor. Control rods are also heavy, expensive to fabricate, and require complicated positioning mechanisms.

Spectral shift systems also have been proposed for reactivity control. These systems utilize a hydrogen-bearing material which acts as a neutron moderator. The reactor control is accomplished by varying the amount of this moderator material in the reactor. In this manner, the number of neutrons which will cause fission is controlled. Spectral shift systems require complicated apparatus for maintaining the proper amount of hydrogen-bearing material.

SUMMARY OF THE INVENTION

These problems have been solved by utilizing a gaseous control system constructed in accordance with the present invention. Reactivity is controlled by varying the density of a neutron-absorbing gas which is contained in control tubes within the reactor core. This gas is supplied to these tubes when a reduction in reactivity is required, and it is removed by venting the tubes to increase the reactivity. Flow-restricting orifices are used to limit the flow into and out of the control tubes.

It is, therefore, an object of the present invention to provide an improved control system for a nuclear reactor that is light in weight, simple in construction and operation, and inexpensively fabricated.

Another object of the invention is to provide an improved control system for a nuclear reactor which minimizes perturbations of the power distribution.

A further object of the invention is to provide an improved nuclear reactor having no solid control rods whereby the size of the reactor is kept at a minimum.

These and other objects and advantages of the invention will be apparent from the specification which follows and from the drawings wherein like numerals are used throughout to identify like parts.

DESCRIPTION OF THE PREFERRED EMBODIMENT

Figure 2:
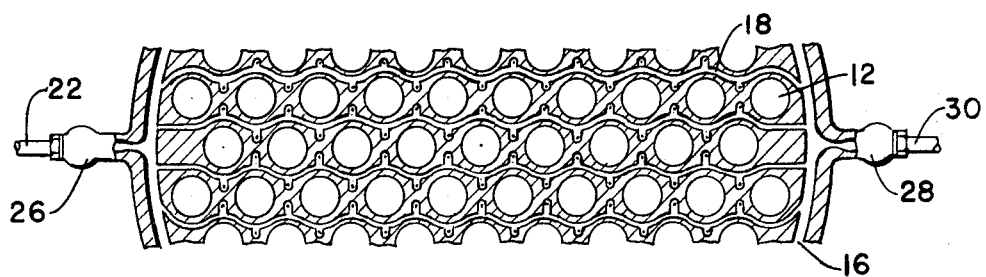
FIG. 2 is a sectional view taken along the line 2—2 in FIG. 1.
Figure 1:
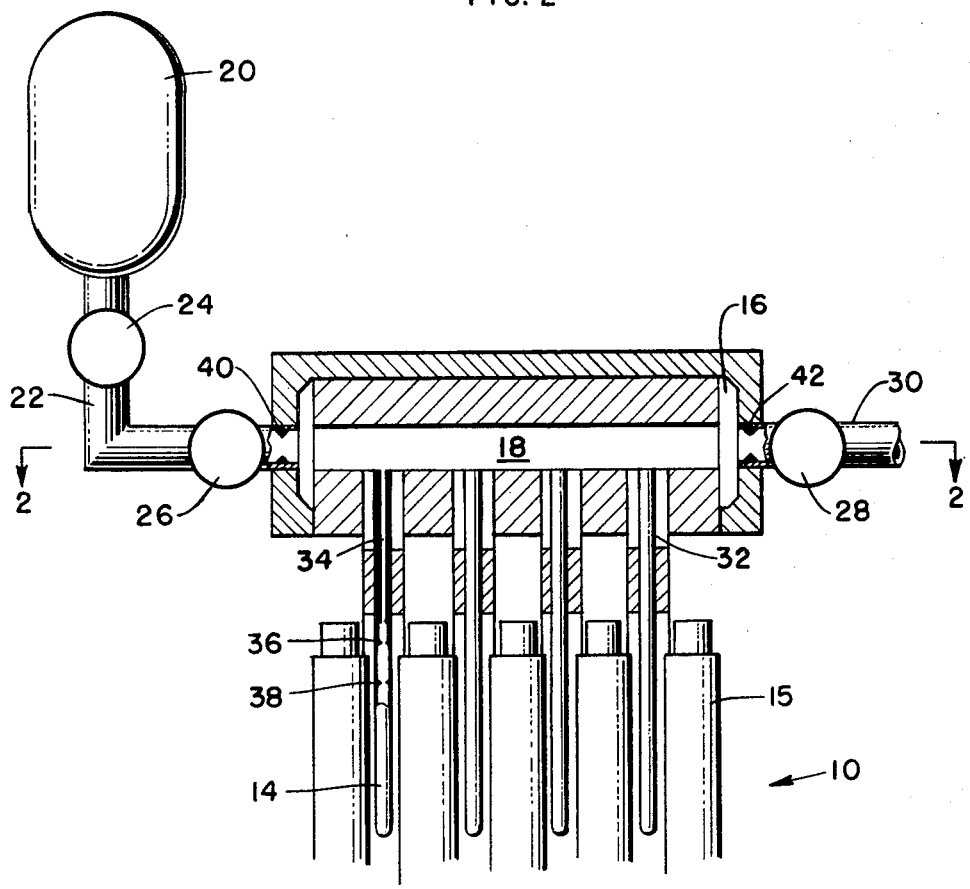
FIG. 1 is a vertical sectional view through a nuclear reactor having a control system constructed in accordance with the invention.

Referring now to the drawing, there is shown a nuclear reactor core 10 having a reactivity control system constructed in accordance with the present invention. Spaced clearance holes 12 are provided in the core 10 as shown in FIG. 2 for receiving fuel elements 15.

According to the present invention, a plurality of reactivity control tubes 14 are distributed throughout the core 10 about the clearance holes 12. The control tubes 14 are interconnected through a distribution system which transports a neutron-absorbing gas to and from each tube. A supply-and-vent system is located outside the core 10 together with the required controls, valves, and instrumentation required to operate the control system. This supply-and-vent system includes a plenum 16 which is positioned adjacent the reactor core 10. The plenum 16 is connected to passages 18 which extend normal to the tubes 14.

A high-pressure supply tank 20 is provided for storing the control gas. The tank 20 is placed in communication with the distribution plenum 16 through a supply pipe 22. A pressure regulator 24 is provided in the pipe 22 adjacent the tank 20. An inlet feed valve 26 is positioned in the pipe 22 adjacent the distribution plenum 16.

An exhaust valve 28 is provided at the exit side of the distribution plenum 16. This exhaust valve 28 is placed in a discharge pipe 30 which is connected to a storage tank. The discharge pipe 30 may be open to the vacuum of space when the reactor is used in a space vehicle.

The distribution passages 18 are connected to the control tubes 14 through feed tubes 32. A bore 34 extends through each feed tube 32. One end of the bore 34 opens into one of the distribution passages 18 and the other end opens into a control tube 14. These passages have a diameter of about 0.050 inch.

A neutron-absorbing gas is stored under pressure in the tank 20 and is fed to the plenum 16 through the pipe 22. By way of example, helium 3 can be used for this purpose. Helium 3 is chemically inert and has a thermal neutron absorption cross section of about 5,000 barns.

An important feature of the invention is the provision of flow-restricting orifices 36 and 38 in each control tube 14. These orifices limit the flow of control gas into and out of the control tubes 14 to prevent an uncontrollable reactor excursion. These orifices can be sized to limit the loss rate of control gas from the reactor when a leak develops outside the core 10 on the outboard side of the orifices. A fluid surrounding the orifices prevents rapid loss of the control gas if a leak occurs on the inboard side of the orifices. If the pressure of the control gas inside the control tube 14 is greater than the fluid pressure, some of the poison from the control gas would be forced into this fluid. The rate of poison loss can be reduced by maintaining the fluid pressure higher than the pressure of the gas in the control system. The fluid is more dense than the control gas; thus, the flooding rate of the control system with higher fluid pressure will be slower than the venting rate would be if the gas pressure was higher. The flooding rate is further reduced by constricting the bore 34 in each feed tube 32.

The total volume of the control tubes 14 is large enough to hold a sufficient amount of control gas to regulate the reactivity of the reactor. The gas pressure within the control tubes 14 is maintained lower than the surrounding fluid pressure to avoid accidental loss of the gas. The temperature and pressure of the control gas is reduced as much as possible by cooling, and the gas passages are kept small to reduce the average temperature within the gas.

By way of example, the control tube 14 may have an annular configuration in which the control gas is held in a space between two concentric tubes. This provides a large surface area for heat removal, and the annulus width can be made small to minimize the average temperature within the gas. The control tube 14 is fabricated from a material with high thermal conductivity which minimizes the temperature rise across the tube wall. The material has a low neutron absorption cross section. The heat generated in the neutron-absorbing gas can be reduced by adding internal fins with high thermal conductivity and ion stopping power into the gas space.

In operation, both the inlet valve 26 and the exhaust valve 28 are closed. Control gas is admitted to the reactor core 10 from the supply tank 20 by opening the inlet valve 26 to decrease reactivity. The admission rate is controlled by an orifice 40 in the distribution plenum adjacent the valve 26. This orifice 40 is designed for choked flow, and the amount of control gas inserted depends solely on the length of time the inlet valve 26 is opened. This operation is similar to the operation of a control rod drive motor. For automatic operation the valve 26 is controlled to open in response to a neutron flux signal.

When it is desired to increase reactivity, gas is vented to space or a collection tank through an exhaust control orifice 42 by opening the exhaust valve 28. This valve may be connected to suitable controls for automatic operation. By incorporating the orifices 40 and 42 within the distribution plenum 16 in both the main inlet flow and main exhaust flow, the control gas must pass through these controlling orifices if there is a system break to the outside environment during power operation.

The speed of response of the all gas system is decreased to that of a control rod system by the orifices 40 and 42. This creates a need for an auxiliary scram system. A low-inertia scram system, such as one which allows highly pressurized gadolinium nitrate to go into the bulk moderator just above the center of the core, can be utilized.

Although the preferred embodiment of the invention has been shown and described, it will be appreciated that various modifications may be made without departing from the spirit of the invention or the scope of the subjoined claims. For example, while the gas utilized in the control system is preferably helium 3, other gases may be used. Also, it is contemplated that the control gas containers may be other than tube geometries.

What is claimed is:

1. In a nuclear reactor of the type having a core containing a plurality of spaced clearance holes, the improvement comprising
   control tubes distributed throughout said core between said clearance holes,
   said control tubes being closed at one end and open at the other,
   distribution means interconnecting all of said control tubes at the open ends thereof for transporting a neutron-absorbing gas to and from the same,
   a plurality of flow-restricting orifices in each of said control tubes adjacent the open ends thereof for limiting the flow of said gas to and from said control tubes,
   supply means outside said core for supplying said gas under pressure to said distribution means for decreasing the reactivity of said nuclear reactor, and
   vent means for removing said gas from said distribution means for increasing the reactivity of said nuclear reactor.

2. Apparatus as claimed in claim 1 wherein the distribution means comprises
   a feed tube extending from each of said control tubes, and
   passages interconnecting a plurality of said feed tubes.

3. Apparatus as claimed in claim 1 wherein the supply means comprises
   a plenum connected to said distribution means,
   a supply pipe connected to said plenum, and
   a tank for storing said neutron-absorbing gas connected to said supply pipe.

4. Apparatus as claimed in claim 3 including at least one flow-restricting orifice in said plenum.

5. Apparatus as claimed in claim 3 wherein the vent means comprises
   an exhaust valve connected to said plenum.

* * * * *